US010708803B2

(12) United States Patent
Raghothaman

(10) Patent No.: US 10,708,803 B2
(45) Date of Patent: Jul. 7, 2020

(54) COEXISTENCE REPORTING BASED ON USER EQUIPMENT (UE) MEASUREMENTS

(71) Applicant: CommScope Technologies LLC, Hickory, NC (US)

(72) Inventor: Balaji B Raghothaman, Chester Springs, PA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/243,900

(22) Filed: Jan. 9, 2019

(65) Prior Publication Data
US 2019/0223037 A1    Jul. 18, 2019

Related U.S. Application Data

(60) Provisional application No. 62/668,484, filed on May 8, 2018, provisional application No. 62/633,428, filed
(Continued)

(51) Int. Cl.
*H04W 24/10*    (2009.01)
*H04W 72/08*    (2009.01)
(Continued)

(52) U.S. Cl.
CPC .......... *H04W 24/10* (2013.01); *H04W 16/14* (2013.01); *H04W 72/082* (2013.01); *H04W 72/085* (2013.01); *H04W 88/02* (2013.01)

(58) Field of Classification Search
CPC ... H04W 24/10; H04W 72/085; H04W 88/02; H04W 16/14; H04W 72/082
See application file for complete search history.

(56) References Cited

U.S. PATENT DOCUMENTS

| 2017/0188241 A1 | 6/2017 | Mueck et al. |
| 2017/0208454 A1 | 7/2017 | Knisely et al. |

(Continued)

FOREIGN PATENT DOCUMENTS

| WO | 2016195751 A1 | 12/2016 |
| WO | 2017065852 A1 | 4/2017 |
| WO | 2018004641 A1 | 1/2018 |

OTHER PUBLICATIONS

International Searching Authority, "International Search Report and Written Opinion from PCT Application No. PCT/US2019/012912 dated May 3, 2019", from Foreign Counterpart to U.S. Appl. No. 16/243,900, pp. 1-11, Published: WO.

*Primary Examiner* — Jamal Javaid
(74) *Attorney, Agent, or Firm* — Fogg & Powers LLC

(57) ABSTRACT

A system for reporting UE measurements is disclosed. The system includes a spectrum access system (SAS) configured to allocate a frequency band in the system, a coexistence manager (CxM) communicatively coupled to the SAS and allocate a set of radio frequency (RF) channels within the frequency band. The system also includes one or more CBSDs communicatively coupled to the SAS and CxM and configured to provide wireless service to user equipment (UEs) using one or more of the RF channels allocated by the CxM. The CxM is configured to manage co-existence of the CBSDs and advise the SAS on how to allocate the RF channels based, at least in part, on aggregated measurement reports provided to the CxM from the CBSDs.

20 Claims, 7 Drawing Sheets

Related U.S. Application Data on Feb. 21, 2018, provisional application No. 62/618,478, filed on Jan. 17, 2018.

(51) Int. Cl.
 *H04W 16/14* (2009.01)
 *H04W 88/02* (2009.01)

(56) References Cited

U.S. PATENT DOCUMENTS

| | | |
|---|---|---|
| 2017/0318470 A1 | 11/2017 | Srikanteswara et al. |
| 2018/0115903 A1* | 4/2018 | Badic .................... H04W 12/02 |
| 2018/0288620 A1* | 10/2018 | Jayawickrama ...... H04W 72/10 |

* cited by examiner

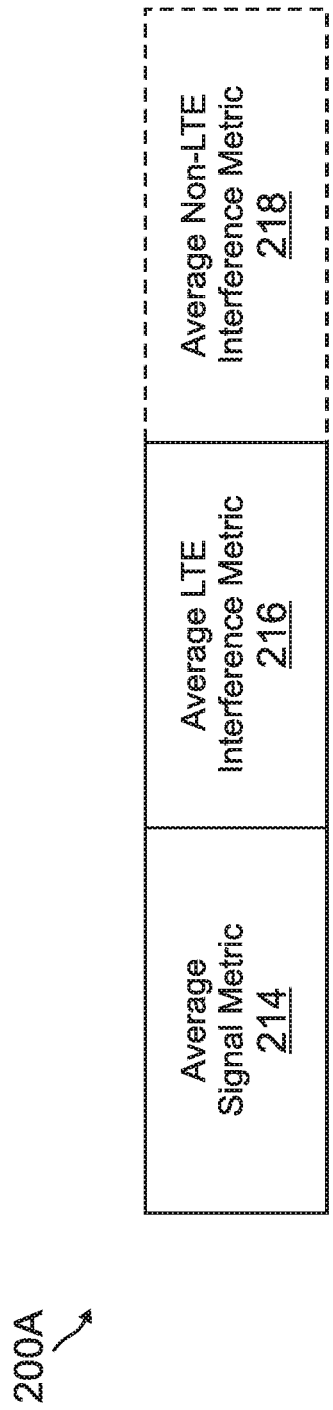
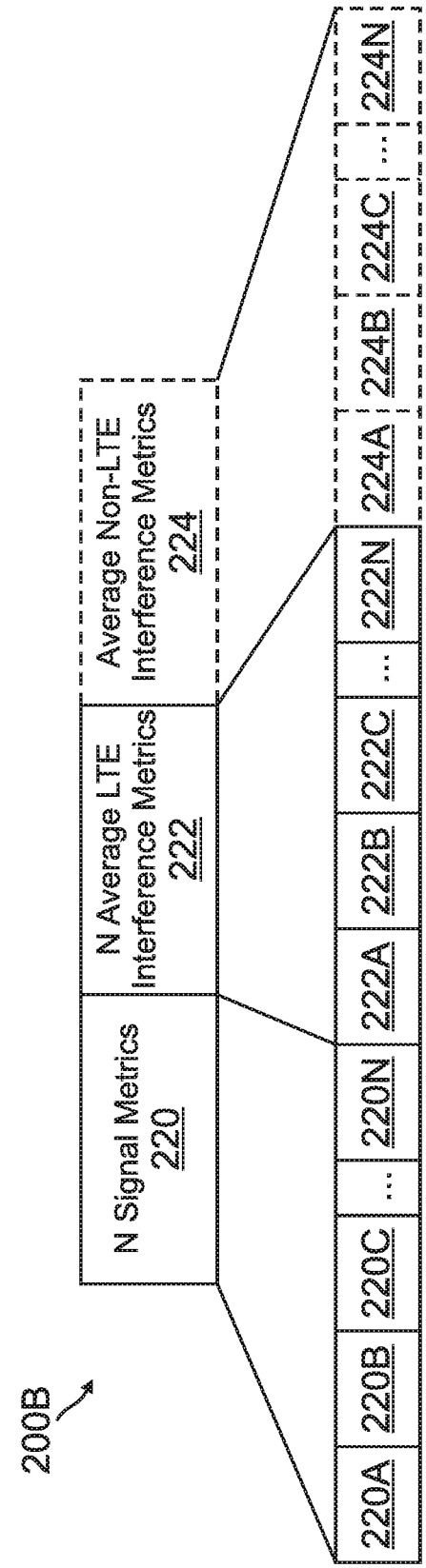

COEXISTENCE REPORTING BASED ON USER EQUIPMENT (UE) MEASUREMENTS

CROSS-REFERENCE TO RELATED APPLICATIONS

This application claims the benefit of U.S. Provisional Patent Application Ser. No. 62/618,478 filed on Jan. 17, 2018, entitled "COEXISTENCE REPORTING BASED ON UE MEASUREMENTS"; U.S. Provisional Patent Application Ser. No. 62/633,428 filed on Feb. 21, 2018, entitled "COEXISTENCE REPORTING BASED ON UE MEASUREMENTS"; and U.S. Provisional Patent Application Ser. No. 62/668,484 filed on May 8, 2018, entitled "COEXISTENCE REPORTING BASED ON UE MEASUREMENTS"; all of which are hereby incorporated herein by reference.

BACKGROUND

Due to the explosive growth in mobile broadband traffic and its concomitant strain on limited spectrum resources, the Federal Communications Commission has adopted rules to allow commercial shared use of 150 MHz of spectrum in the 3550-3700 MHz (3.5 GHz) band for licensed and unlicensed use of the 3.5 GHz band for a wide variety of devices.

Citizens Broadband Radio Service (CBRS) is a tiered commercial radio service in 3.5 GHz in the U.S. Channels are allocated within and across tiers. These tiers can include, in order of priority, (1) incumbent licensees; (2) Priority Access (PA) licensees; and (3) General Authorized Access (GAA) operators. Portions of spectrum that are not continuously used by an incumbent licensee can be allocated to the secondary users that is, PA licensees and GAA operators.

A Priority Access License (PAL) is an authorization to use a channel (e.g., an unpaired 10 MHz channel) in the 3.5 GHz range in a geographic service area for a period (e.g., 3 years). The PAL geographic service area may be census tracts, which typically align with the borders of political boundaries such as cities or counties. PAL licensees can aggregate up to four PA channels in any census tract at any given time, and may obtain licenses in any available census tract. PALs may provide interference protection for Tier 1 incumbent licensees and accept interference from them. However, PALs may be entitled to interference protection from GAA operators.

The third tier, GAA, permits access to bandwidth (e.g., 80 MHz) of the 3.5 GHz band that is not assigned to a higher tier (i.e., incumbent licensees or PAL licensees). GAA operators may be licensed "by rule," meaning that entities that qualify to be FCC licensees may use FCC-authorized telecommunications equipment in the GAA band without having to obtain an individual spectrum license. GAA operators may receive no interference protection from PA licensees or Tier 1 operators, and may accept interference from them.

In order to facilitate the complex CBRS spectrum sharing process, a Spectrum Access System (SAS), which may be a highly automated frequency coordinator, can be used to assign frequencies in the 3.5 GHz CBRS band. The SAS can also authorize and manage use of the CBRS spectrum, protect higher tier operations from interference, and maximize frequency capacity for all CBRS operators.

SUMMARY

A system for reporting UE measurements is provided. The system includes a spectrum access system (SAS) configured to allocate a frequency band in the system, a coexistence manager (CxM) communicatively coupled to the SAS and allocate a set of radio frequency (RF) channels within the frequency band. The system also includes one or more CBSDs communicatively coupled to the SAS and CxM and configured to provide wireless service to user equipment (UEs) using one or more of the RF channels allocated by the CxM. The CxM is configured to manage co-existence of the CBSDs and advise the SAS on how to allocate the RF channels based, at least in part, on aggregated measurement reports provided to the CxM from the CBSDs.

DRAWINGS

Understanding that the drawings depict only exemplary configurations and are not therefore to be considered limiting in scope, the exemplary configurations will be described with additional specificity and detail through the use of the accompanying drawings, in which:

FIG. 2A is a block diagram illustrating an exemplary aggregated measurement report according to a second option for aggregating UE measurements;

FIG. 2B is a block diagram illustrating an exemplary aggregated measurement report according to a third option for aggregating UE measurement reports;

In accordance with common practice, the various described features are not drawn to scale but are drawn to emphasize specific features relevant to the exemplary configurations.

DETAILED DESCRIPTION

Unlicensed spectrum in the CBRS band may be allocated using a complex propagation map model (also referred to as a "map" herein) that indicates levels of interference each device will cause another device. However, the map may be approximate, e.g., the pathloss/interference estimated in the map may not be very accurate. This inaccuracy may cause inefficient spectrum allocation, i.e., when relying on an inaccurate map, spectrum may be allocated in a way that causes high levels of interference in the system and, thus, unnecessarily low throughput for UEs in the system.

Rather than relying on the pathloss modeling alone, which may be inaccurate, it may be advantageous to use actual measurements from the various devices (e.g., UEs and/or CBRS base stations, called CBSDs) in the CBRS system when allocating RF channels. However, UEs may produce many measurements, so it may be impractical and inefficient to report all individual UE measurement reports to a centralized spectrum-allocating device(s), e.g., a SAS and/or a CBRS connection manager (CxM). To solve this problem, CBSDs of currently proposed systems and methods may receive UE measurement reports, aggregate the measurements, and send aggregated measurement reports to the CxM to enable more efficient spectrum allocation, i.e., spectrum may be allocated in a way that minimizes interference in the system and, thus, enables higher throughput for UEs in the system. In other words, the present systems and methods may enable the use of actual UE measurements for spectrum allocation without unduly causing network congestion.

The present systems and methods may also describe how a CBRS system may efficiently identify and correct for inaccuracies in the pathloss modeling (e.g., the map) using the UE measurement reports. The present systems and methods may also be used to directly add or subtract edges to the graph (i.e., a distillation of the propagation map).

Figure 1:
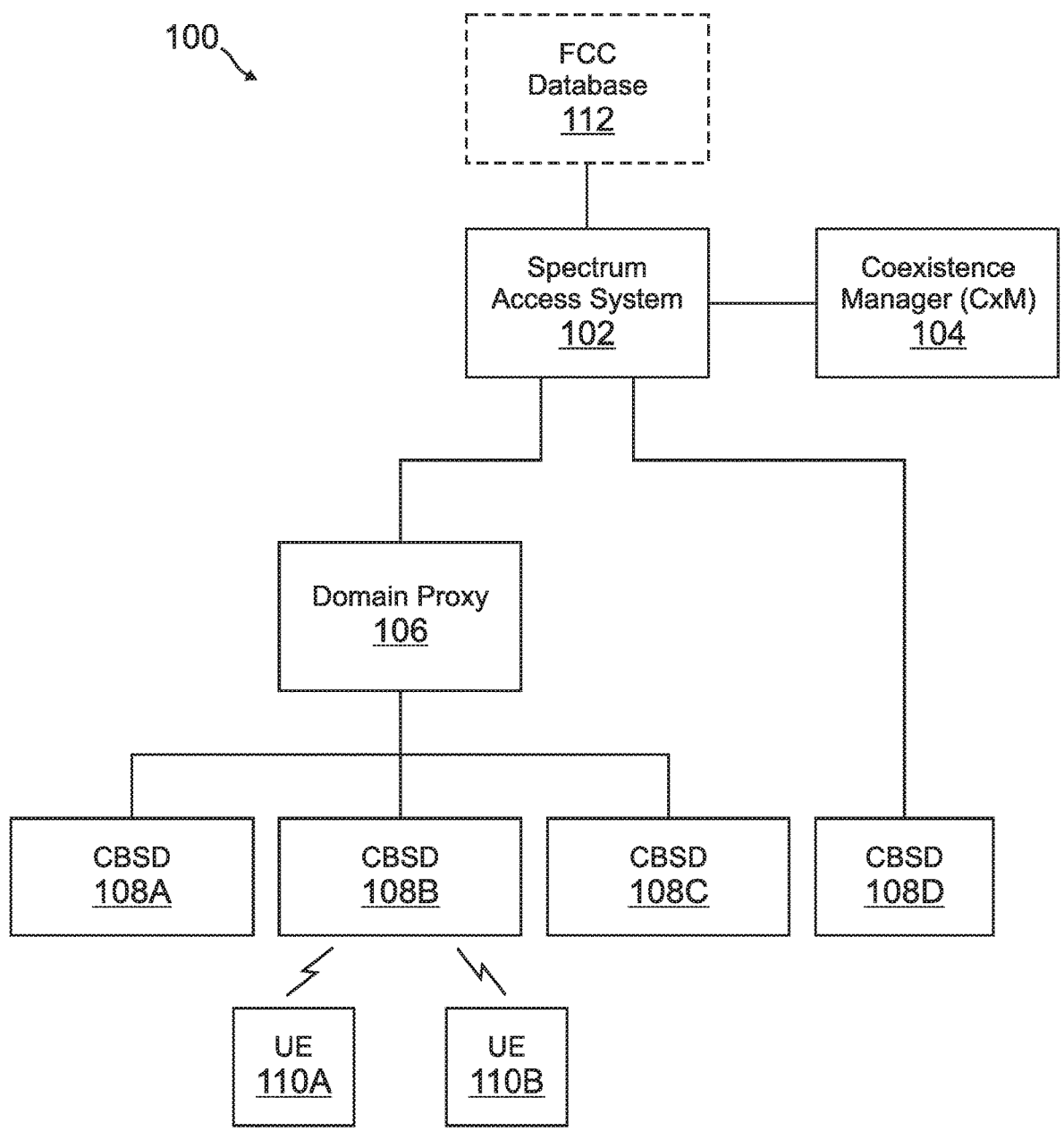
FIG. 1 is a block diagram illustrating one exemplary configuration of a Citizens Broadband Radio Service (CBRS) system for reporting UE measurements.

FIG. 1 is a block diagram illustrating one exemplary configuration of a Citizens Broadband Radio Service (CBRS) system 100 for reporting UE 110 measurements. The system 100 may include a spectrum access system (SAS) 102, a CBRS coexistence manager (CxM) 104, one or more Citizens Broadband Radio Service devices (CBSDs) 108A-D, and one or more user equipments (UEs) 110A-B. All devices transmitting in the CBRS band (e.g., CBSDs 108, UEs 110) are required to be able to transmit and receive in the entire 3.5 GHz band, even if they are not deployed in that manner. Devices operating in the CBRS band may also be required to transmit according to FCC guidelines.

The SAS 102 may be an FCC-mandated function that allocates CBRS spectrum in a geographical area. The SAS 102 may be implemented with one or more processors in one or more physical devices. The SAS 102 may optionally be coupled to an FCC database 112 that includes data used by the SAS 102 during spectrum allocation.

Since the CBRS band is open spectrum, it can be used by different devices operating according to different wireless protocols, e.g., CBRS devices, Wireless Internet Service Providers Association (WISPA) devices, Wi-Fi devices, etc. In order to enable coexistence between various devices (CBRS or otherwise) using CBRS spectrum in the system 100, the SAS 102 may allocate the CBRS spectrum in a way that protects users from lower levels. For example, when an incumbent licensee transmits, the SAS 102 may prevent lower-tiered users, such as Priority Access (PA) licensees and General Authorized Access (GAA) operators, from transmitting. The SAS 102 may receive data from a network of sensors (not shown) that detects incumbent (and/or other) transmissions.

Devices (e.g., CBSDs 108) operating in the CBRS band may be required to register with the SAS 102 and provide their location and other details to the SAS 102. The SAS 102 may then allocate a set of RF channels that the PA and GAA users can access. The SAS 102 may also limit the maximum power of CBSDs 108 to perform interference mitigation between tiers.

The CBRS Alliance is a group of operators that promulgates rules/specifications for its members when using the CBRS band. In addition to FCC Guidelines, devices certified by the CBRS Alliance (e.g., CBSDs 108, CxM 104, and/or UEs 110) must also comply with the rules/specifications promulgated by the CBRS Alliance.

Each CBSD 108 may be a device that provides wireless (e.g., Long Term Evolution (LTE)) service to one or more user equipments (UEs) 110 in a surrounding geographical area. The CBSDs 108 may alternatively be referred to as "enhanced Node Bs," "eNBs," "small cells," radio service devices," etc. In one configuration, the CBSDs 108A-C may be coupled to the SAS 102 via a domain proxy 106. Alternatively, a CBSD 108D may be coupled to the SAS 102 without an intervening domain proxy 106. Alternatively, the CBSDs 108 may be coupled to the CxM 104 directly. In any case, the CBSDs 108 may be communicatively coupled to the SAS 102 and/or CxM 104, e.g., using one or more Ethernet connections. The CBSDs 108 may be PAL and/or GAA users.

The UEs 110 may be mobile end user terminals, and may also referred to as handsets, smartphones, cell phones, access terminals, wireless communication devices, mobile devices, etc. The UEs 110 may be LTE UEs that are additionally certified by the CBRS Alliance. The UEs 110 may wait for authorization from a nearby CBSD 108 before transmitting in the CBRS band.

The CxM 104 may manage the interference between the deployed devices (e.g., the CBSDs 108) by advising the SAS 102 about channel allocation. The CxM 104 may be implemented as a component of the SAS 102 or a separate physical device that is coupled to the SAS 102, e.g., by an Ethernet connection.

During operation, the SAS 102 may allocate a chunk of spectrum (i.e., a set of radio frequency (RF) channels) to the CxM 104. The CxM 104 may then sub-allocate the spectrum among the CBSDs 108. Therefore, the CBSDs 108 may provide wireless service to the UEs 110 using one or more of the RF channels allocated thereto by the CxM 104.

Each CBSD 108 may provide location information (e.g., GPS) to the SAS 102 and/or the CxM 104. Additionally, the SAS 102 and/or the CxM 104 may have access to terrain/building data, i.e., data that describes the physical propagation environment. The SAS 102 and CxM 104 together may form a propagation map (i.e., map) that indicates levels of interference each device (e.g., each CBSD 108) will cause another device. Using the map, the SAS 102 and CxM 104 may allocate/grant spectrum to the various CBSDs 108 in the system 100.

However, the map may be inaccurate due to incomplete or inaccurate location information and/or terrain/building data. Therefore, the CxM 104 may utilize UE 110 measurement reports to identify and/or change/update inaccurate data in the map. Each CBSD 108 may collect UE 110 measurement report from each UE 110 that it serves, i.e., each UE 110 for which the CBSD 108 provides wireless service. Specifically, the UEs 110 may be configured to periodically measure one or more types of measurements in a UE 110 measurement report sent to a CBSD 108: a signal metric, an LTE interference metric, a non-LTE interference metric, and/or a fifth generation (e.g., as defined by the 3rd Generation Partnership Project (3GPP) Release 15) interference metric. Alternatively, instead of a single LTE interference metric, the UEs 110 may measure separate LTE co-channel interference and LTE other-channel interference metrics in each UE 110 measurement report. The metrics may be measured by the respective UEs 110 every few (e.g., 1, 2, 5, 10, 20, 50, or 100) ms and reported to a serving CBSD 108.

A signal metric may be a metric for a signal received from a serving cell, i.e., a metric relating to a desired signal. An LTE interference metric may be a metric for a signal received from an interfering LTE cell, i.e., an interfering signal. A non-LTE interference metric may be a metric for all interference in a particular channel. For example, a UE 110 may experience interference in the CBRS band from other wireless protocols that it does not or cannot decode, e.g., from a Wi-Fi device. Accordingly, the UE 110 may capture this type of interference using a non-LTE interference metric that reflects interference from all types of devices on a particular channel. A 5G interference metric may be a metric for a signal received from an interfering 5G neighbor, i.e., an interfering signal. In some configurations, 5G interference may be reported separately from or as part of the non-LTE interference metric(s). The term "sector" and "cell" may be used interchangeably to refer to a CBSD 108, one or more radio antennas of a CBSD 108, or a geographical area covered by one or more radio antennas of a CBSD 108.

Each individual metric in a UE measurement report may be a reference signal received power (RSRP) or a signal-to-interference-plus-noise ratio (SINR) metric. Alternatively, other types of signal metrics may be used, e.g., Reference Signal Received Quality (RSRQ), ReferenceSignalPower in System Information Block 2 (SIB2), Qhyst in System Information Block 3 (SIB3), Qoffset in System Information Block 4 (SIB4), or some combination.

It may be impractical and inefficient to report all individual UE 110 measurement reports to the CxM 104 because it may cause network congestion. Therefore, upon receiving the various UE 110 measurement reports, the CBSDs 108 may aggregate the UE 110 measurement reports into an aggregated measurement report before periodically sending to the CxM 104, e.g., every few (e.g., 1, 2, 3, 4, 5, or 10) seconds. Alternatively, CBSDs 108 may determine and send aggregated measurement reports more frequently, e.g., every 5, 10, 20, 50, 100, 200, or 500 ms. The CBSDs 108 may use one of four options to aggregate the UE 110 measurement reports.

In a first option, a particular CBSD 108 may periodically send one ordered list (e.g., tuple) per UE 110. Each tuple may include average and/or other statistics of UE measurements, e.g., an average signal metric across all UE 110 measurements from a particular UE 110, an average LTE interference metric across all UE 110 measurements from the particular UE 110, and, optionally, an average non-LTE interference metric across all UE 110 measurements from the particular UE 110. The first option may provide more granular data for the CxM 104, but may significantly increase the quantity of transmitted data compared to other options. Other types of statistics may be used for the first option instead of an average, e.g., a median.

In other options, a particular CBSD 108 may periodically send one aggregated measurement report per interferer (e.g., per neighboring CBSD 108 that interferes with signals from the particular CBSD 108) across UE 110 measurement reports from multiple UEs. The second, third, and fourth options discussed below are possible ways that the CBSD 108 may aggregate statistics from different UEs 110 into a single aggregated measurement report.

In a second option, each aggregated measurement report may include an average signal metric across all UEs 110 experiencing interference from a particular interferer, an average LTE interference metric across all UEs 110 experiencing interference from the particular interferer, and, optionally, an average non-LTE interference metric across all UE 110 measurement reports. In one configuration, only UE 110 measurement report(s) that cross an interference threshold may be used when determining the aggregated measurement report(s) according to the second option.

In a third option, UE 110 measurement reports may be segregated into N bins based on the signal metric in each UE 110 measurement report, and the interference metrics for the UE 110 measurement reports in each bin may be averaged. For each interferer, the CBSD 108 may send an aggregated measurement report with N signal metrics (one for each of N bins), N average LTE interference metric (one for each of N bins), and, optionally, one or more average non-LTE interference metrics (e.g., one for each of N bins). The UE 110 measurement reports may be segmented every M dBm of signal metric strength. In one example, signal metrics may be measured from −60 dBm to −100 dBm. In this example, there may be 8 bins (N=8) of 5 dBm each (M=5 dBm), i.e., a first bin from −60 dBm to −65 dBm, a second bin from −65 dBm to −70 dBm, a third bin from −70 dBm to −75 dBm, etc. Different values for M and N are possible and consistent with the present systems and methods.

In an alternative configuration of the third option, the UE 110 measurement reports may be segregated into N bins based on the signal metric in each UE 110 measurement report, and the interference metrics for the UE 110 measurement reports in each bin may be counted (instead of averaged). Then, for each interferer, the CBSD 108 may send an aggregated measurement report with N signal metric counts (i.e., one cardinality for each of N bins), N LTE interference metric counts (i.e., one cardinality for each of N bins), and, optionally, one or more non-LTE interference metric counts (i.e., one cardinality for each of N bins).

In a fourth option, the UE 110 measurement reports may be mapped to a two-dimensional density function. For example, one axis of the two-dimensional density function may be a signal metric of the UE 110 measurement report and the other axis may be the LTE interference metric of the UE 110 measurement report. The two-dimensional density function may be divided into an N×P grid of bins. Each bin may be assigned an x index a y index, and a probability for the bin (P(x,y)). A two-dimensional density function may be determined for each interfering neighbor.

An aggregated measurement report may be sent for each bin in the two-dimensional density function that includes a non-trivial number (i.e., greater than a minimum threshold) of UE 110 measurement reports. Each aggregated measurement report may include the x index of the bin (e.g., a range of signal metrics), the y index of the bin (e.g., a range of interference metrics), and the probability (P(x,y)) of the bin. Each probability (P(x,y)) may be a decimal (between 0 and 1) that indicates a probability of interference among UE 110 measurement reports in the bin. Alternatively, each probability (P(x,y)) may be an integer that indicates the number of UE 110 measurement reports (i.e., cardinality) in the bin. Such indexing enables more efficient transmission of the information, as long as the transmitting CBSD 108 and the CxM 104 both have a common understanding of what the indices represent.

Alternatively, instead of bin indices, an aggregated measurement report for a bin may include an average signal metric ($R_1$) for UE 110 measurements in the bin, an average LTE interference metric ($R_2$) for UE 110 measurements in the bin, and a probability for the bin ($P(R_1,R_2)$), where $P(R_1,R_2)$ is the probability of interference among UE 110 measurements in the bin that is associated with an average signal metric of $R_1$ and an average LTE interference metric of $R_2$.

An aggregated measurement report (e.g., according to the second, third, or fourth options) may be determined by a particular CBSD 108 for each neighboring CBSD 108 that is close enough to interfere with communication between the particular CBSD 108 and the UEs 110 that it serves. Additionally, aggregated measurement report(s) may also be determined for one or more interfering non-CBSD devices, e.g., non-CBSD LTE base stations, UEs 110 not served by the particular CBSD 108, Wi-Fi access points, etc. For example, the particular CBSD 108 may periodically determine an aggregated measurement report for every interfering CBSD 108 and every interfering non-CBSD LTE base station, e.g., every few (e.g., 1, 2, 3, 4, 5, or 10) seconds. Alternatively, CBSDs 108 may determine and send aggregated measurement reports more frequently, e.g., every 5, 10, 20, 50, 100, 200, or 500 ms.

The particular CBSD 110 may send the aggregated measurement report(s) to the CxM 104, e.g., directly, or via the SAS 102 and/or the domain proxy 106. The CxM 104 may use the aggregated measurement report(s) to allocate the RF channels to the CBSDs 108 in the system 100. The CxM 104 may also use the aggregated measurement report(s) to identify and correct inaccuracies in the previously-determined pathloss modeling (e.g., the map).

FIG. 2A is a block diagram illustrating an exemplary aggregated measurement report 200A according to a second option for aggregating UE 110 measurement reports. The aggregated measurement report 200A may be determined by a particular CBSD 108 based on UE 110 measurement reports from multiple UEs 110, e.g., two or more UEs 110 that the particular CBSD 108 serves.

The aggregated measurement report 200A may include an average signal metric 214. The average signal metric 214 may be the average of the signal metrics from all UEs 110 that (1) are served by the particular CBSD 108; and (2) report LTE interference metrics (above a particular threshold) for a particular interferer.

The aggregated measurement report 200A may also include an average LTE interference metric 216. The average LTE interference metric 216 may be the average of the LTE interference metrics (above a particular threshold), from all UEs 110 served by the particular CBSD 108 that is determining the aggregated measurement report 200A, for a particular interferer.

The aggregated measurement report 200A may also, optionally, include an average non-LTE interference metric 218. The average non-LTE interference metric 218 may be the average of the non-LTE interference metrics from all UEs 110 served by the particular CBSD 108 that is determining the aggregated measurement report 200A.

The aggregated measurement report 200A may also, optionally, include an average 5G interference metric (not shown). The average 5G interference metric may be the average of the 5G interference metrics from all 5G UEs 110 served by the particular CBSD 108 that is determining the aggregated measurement report 200A.

FIG. 2B is a block diagram illustrating an exemplary aggregated measurement report 200B according to a third option for aggregating UE 110 measurement reports. The aggregated measurement report 200B may be determined by a particular CBSD 108 based on UE 110 measurement reports from multiple UEs 110, e.g., two or more UEs 110 that the particular CBSD 108 serves.

The particular CBSD 108 may send a set of binned averages in the aggregated measurement report 200B. Specifically, the particular CBSD 108 may segment UE 110 measurement reports relating to an interferer into N bins based on the signal metrics of the UE 110 measurement reports. For example, an aggregated measurement report 200B, specific to an interferer, may include N signal metrics 220A-N (one for each of N bins), N average LTE interference metrics 222 (one for each of N bins), and, optionally, one or more average non-LTE interference metrics (e.g., N average non-LTE interference metrics 224, one for each of N bins). The bins may be segmented every M dBm of signal strength. In one example, various metrics may be measured from −60 dBm to −100 dBm, e.g., all UE 110 measurement reports with signal metrics between −60 dBm and −65 dBm may be grouped into a first bin, all UE 110 measurement reports with signal metrics between −65 dBm and −70 dBm may be grouped into a second bin, etc. In this example, there may be 8 bins (N=8) of 5 dBm each (M=5 dBm). Different values for M and N are possible and consistent with the present systems and methods.

Alternatively, an aggregated measurement report 200B, for each interferer, may include N signal metrics, N average LTE co-channel interference metrics, N average LTE other-channel interference metrics, and, optionally, one or more average non-LTE interference metrics (e.g., N average non-LTE interference metric bins 224).

Alternatively, an aggregated measurement report 200B, for each interferer, may include N signal metric counts, N LTE interference metric counts, N LTE interference metric counts, optionally one or more non-LTE interference metrics, and/or N 5G interference counts.

The N signal metrics 220 may include N average signal metrics or N signal metric bin indices (one per N bins). If the N signal metrics 220 include N average signal metrics 220, the signal metric 220 for a particular bin may be an average of the signal metrics from all UEs 110 that (1) are served by the particular CBSD 108; and (2) report UE 110 measurement reports with a signal strength metric belonging in the particular bin. If the N signal metrics 220 include N signal metric bin indices, the signal metric 220 for a particular bin may be a bin number, e.g., an integer.

For every signal metric 220, the aggregated measurement report 200A may also include an average LTE interference metric 222A-N, e.g., one for each of N bins. The average LTE interference metric 216 for a particular bin may be the average of the LTE interference metrics from UE 110 measurement reports that also include a signal metric in the particular bin. Therefore, an aggregated measurement report 200B may be determined for each interferer and may include, at least, N signal metrics 220 and N average LTE interference metrics 222.

The aggregated measurement report 200B may also, optionally, include one or more average non-LTE interference metrics (e.g., N average non-LTE interference metrics 224A-N, one for each of N bins). The average non-LTE interference metric 224 for a particular bin may be the average of the non-LTE interference metrics from UE 110 measurement reports that also include a signal metric in the particular bin. Alternatively, each aggregated measurement report 200B may include a single average non-LTE interference metric 224 that is averaged across all UEs 110 served by the particular CBSD 108.

Figures 2C, 2D:
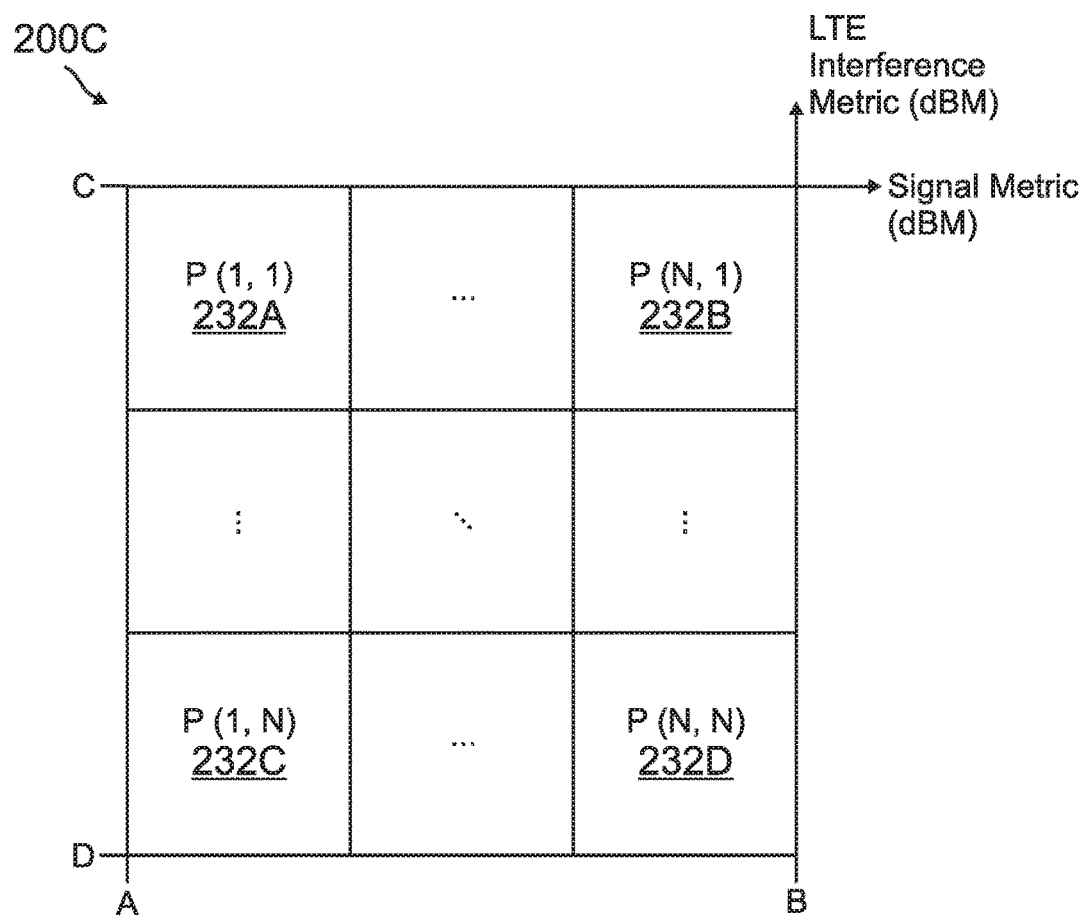
FIG. 2C is a plot illustrating an exemplary two-dimensional density function.
FIG. 2D is a block diagram illustrating an exemplary aggregated measurement report according to a fourth option for aggregating UE measurement reports.

FIG. 2C is a plot illustrating an exemplary two-dimensional density function 200C. The two-dimensional density function 200C may be determined using UE 110 measurement reports. A particular CBSD 108 may determine a single two-dimensional density function 200C for all neighboring interferers or a two-dimensional density function 200C for each neighboring interferer. The two-dimensional density function 200C may be used to aggregate a plurality of UE 110 measurement reports into an aggregated measurement report according to the fourth option discussed herein.

The two-dimensional density function 200C may be a two-dimensional grid with UE 110 measurement reports mapped onto it. In contrast to the third option, UE 110 measurement reports according to the fourth option may be mapped using the signal metric and the LTE interference metric in each UE 110 measurement. For example, the horizontal and vertical axes may correspond to the signal metric (in dBm) and the interference metric (in dBm) of each UE 110 measurement report, respectively.

The two-dimensional density function 200C may be segmented into N×P bins. The signal metric in each UE 110 measurement report may be measured in the range of A dBm to B dBm, e.g., −60 dBm to −100 dBm. Similarly, the interference metric in each UE 110 measurement report may be measured in the range of C dBm to D dBm, e.g., −60 dBm to −100 dBm. However, different ranges for the signal metric and/or the interference metric may be used. The bin sizes/locations can be known a-priori to the CxM 104, one or more CBSDs 108 (e.g., the serving CBSD 108), and/or the domain proxy 106.

A probability (P(x,y)) 232A-D may be determined for each of the N×P bins. Each probability (P(x,y)) 232 may be based on the number of UE 110 measurement reports in a bin. For example, P(1,1) 232A may indicate, directly or indirectly, the number of UE 110 measurement reports in the bin at x index 1 and y index 1. Similarly, P(N,1) 232B may indicate, directly or indirectly, the number of UE 110 measurement reports in the bin at x index N and y index 1, etc.

Each probability (P(x,y)) 232 in bin index (x,y) may be determined by dividing the number of measurements in bin index (x,y) (Nbin(x,y)) by the total number of measurements across all bins (Ntotal), e.g., P(x,y)=Nbin(x,y)/Ntotal. Alternatively, each probability (P(x,y)) 232 may be a decimal (between 0 and 1) that indicates a probability of interference among UE 110 measurement reports in the bin. Alternatively, each probability (P(x,y)) 232 may be an integer that indicates the number of UE 110 measurement reports (i.e., cardinality) in the bin. In either case, the probability (P(x,y)) 232 for a particular bin may be determined based on the number of UE 110 measurement reports in the particular bin (Nbin(x,y)) and/or the total number of measurements across all bins (Ntotal).

Aggregated measurement reports according to the fourth option may simply be a list, e.g., [signal bin index x, interference bin index y, P(x,y)] or [$R_1$, $R_2$, P($R_1$,$R_2$)]. Some of the N×P bins may have a relatively small number of UE 110 measurement reports. Sparsely populated bins (e.g., bins with a number of UE 110 measurement reports that is smaller than a minimum threshold) may not be reported in an aggregated measurement report. In other words, an aggregated measurement report may be sent only for each bin that includes a number of UE 110 measurement reports that is greater than the minimum threshold.

In an alternative configuration (not shown), the aggregated measurement report 200C may be a three-dimensional density function. In this configuration, an aggregated measurement report may include N×P×Q bins: a first axis indexed according to the signal metric in a UE measurement report, a second axis indexed according to the LTE interference metric in the UE measurement report, and a third axis indexed according to the non-LTE interference metric in the UE measurement report. Alternatively, a three-dimensional density function may include N×P×Q bins: a first axis indexed according to the signal metric in a UE measurement report, a second axis indexed according to the LTE co-channel interference metric in the UE measurement report, and a third axis indexed according to the LTE other-channel interference metric in the UE 110 measurement report. In the case of a three-dimensional density function, each aggregated measurement report may include a list with four elements, e.g., [index x, index y, index z, P(x,y,z)].

FIG. 2D is a block diagram illustrating an exemplary aggregated measurement report 200D according to a fourth option for aggregating UE 110 measurement reports. The aggregated measurement report 200D may be determined by a particular CBSD 108 based on a two-dimensional density function, e.g., as illustrated in FIG. 2C.

An aggregated measurement report 200D may be sent for each bin (e.g., in the two-dimensional density function 200C) that includes a number of UE 110 measurement reports that is greater than the minimum threshold. Specifically, each aggregated measurement report 200D may include a signal bin index x 234, an LTE interference bin index y, and a probability (P(x,y)) 232. Each probability (P(x,y)) 232 may be a decimal (between 0 and 1) that indicates a probability of interference among UE 110 measurement reports in the bin. Alternatively, each probability (P(x,y)) 232 may be an integer that indicates the number of UE 110 measurement reports (i.e., cardinality) in the bin.

Figure 3:
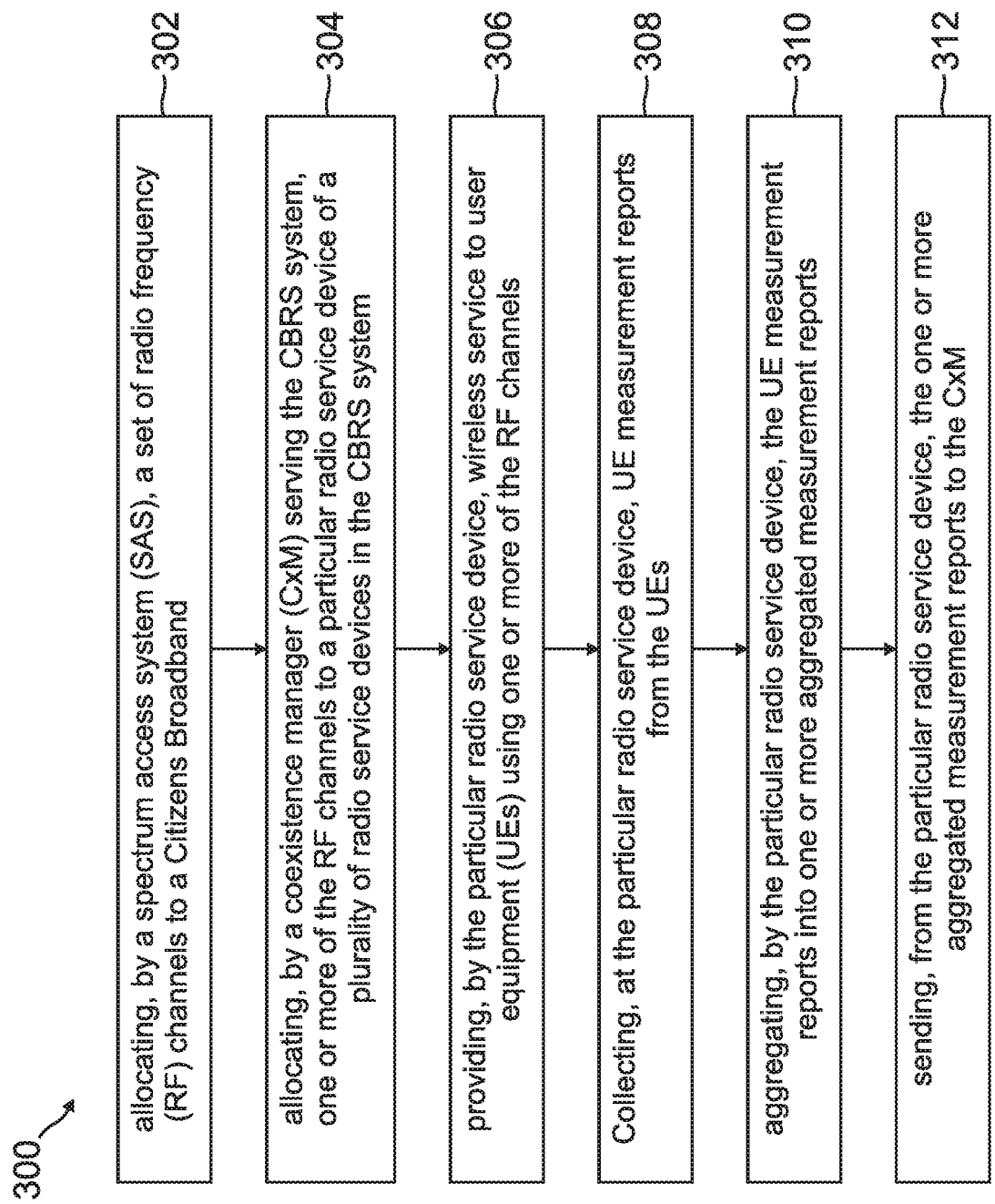
FIG. 3 is a flow diagram illustrating an exemplary method for reporting UE measurements.

FIG. 3 is a flow diagram illustrating an exemplary method 300 for reporting UE 110 measurements. The method 300 may be performed by the CBRS system 100 illustrated in FIG. 1.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that the method 300 can and typically would include such exception handling.

A spectrum access system (SAS) may allocate 302 a set of radio frequency (RF) channels to the CBRS system 100. The CxM 104 may then allocate 304 one or more of the RF channels to a particular radio service device (e.g., CBSD 108) of a plurality of radio service devices (e.g., CBSDs 108) in the CBRS system 100. In other words, SAS 102 may allocate a chunk of RF channels to the CBRS system 100, and the CxM 104 may sub-allocate one or more of the RF channels in the chunk to a particular radio service device (e.g., CBSD 108). The particular radio service device (e.g., CBSD 108) may then provide 306 wireless service to a plurality of UEs 108 using the one or more of the RF channels, i.e., the one or more RF channels sub-allocated to the particular radio service device (e.g., CBSD 108).

The particular radio service device (e.g., CBSD 108) may also collect 308 UE 110 measurement reports from the UEs 110. Specifically, the UEs 110 may be configured to include one or more types of measurements in periodic UE 110 measurement reports: a signal metric, an LTE interference metric, and/or a non-LTE interference metric. Alternatively, instead of a single LTE interference metric, the UEs 110 may measure separate LTE co-channel interference and LTE other-channel interference metrics.

Upon receiving the UE 110 measurement reports, the particular radio service device (e.g., CBSD 108) may aggregate 310 the UE 110 measurement reports into one or more aggregated measurement reports. The particular radio service device (e.g., CBSD 108) may use one of the four options discussed above to aggregate the UE 110 measurement reports into one or more aggregated measurement reports.

The particular radio service device (e.g., CBSD 108) may send 312 the one or more aggregated measurement reports to the CxM 104. The CxM 104 may manage co-existence of the radio service devices (e.g., CBSDs 108) and advise the SAS on how to allocate the RF channels based, at least in part, on the aggregated measurement reports. Managing coexistence may include allocating RF channels in a way that minimizes interference between CBSDs 108.

Figure 4:
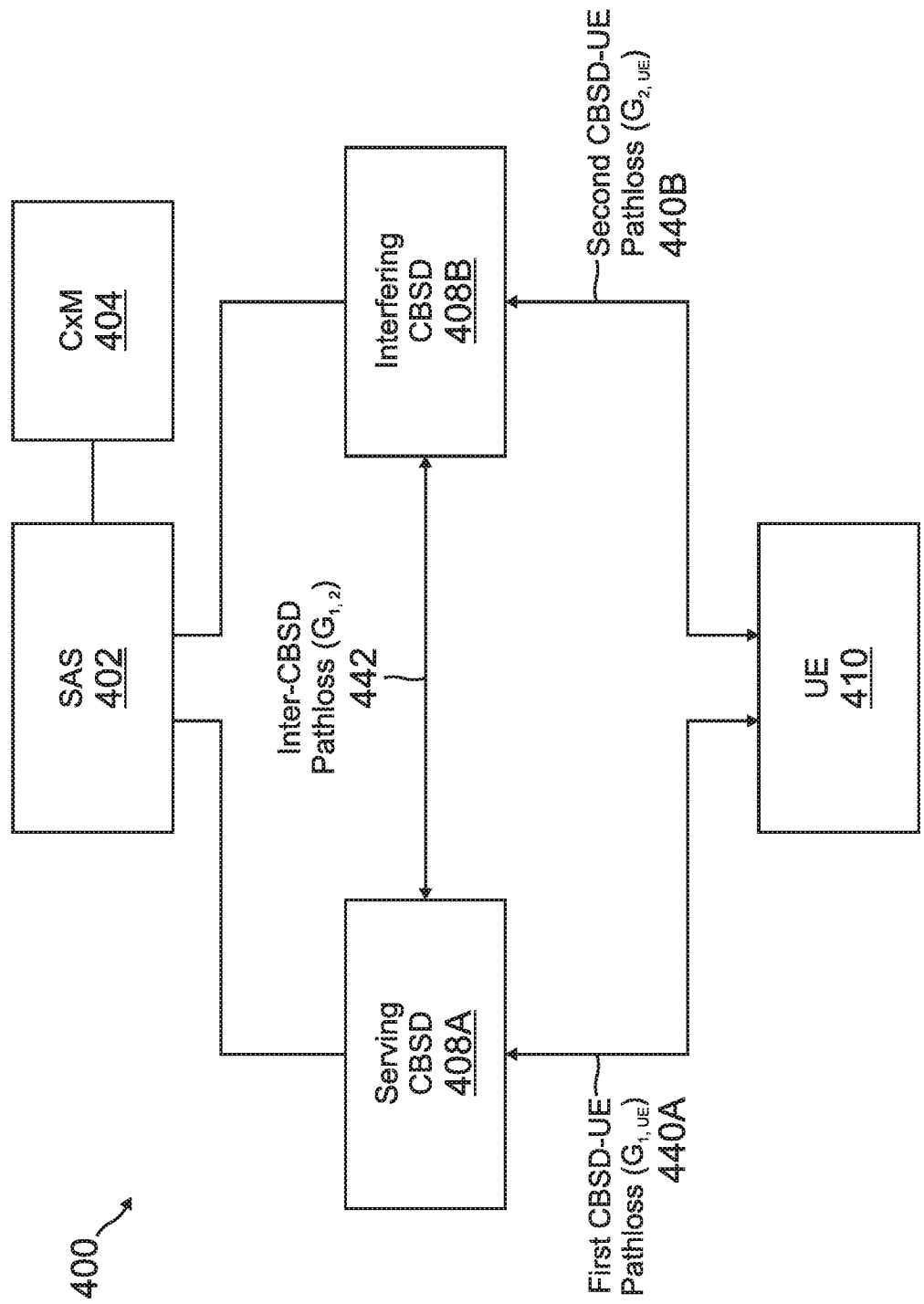
FIG. 4 is a block diagram illustrating pathloss modeling in a CBRS system.

FIG. 4 is a block diagram illustrating pathloss modeling in a CBRS system 400. The system 400 may include a serving CBSD 408A, an interfering CBSD 408B, and a UE 410. The UE 410 may receive wireless service from the serving CBSD 408A, however, the interfering CBSD 408B may interfere with communications between the UE 410 and the serving CBSD 408A. Although it is illustrated with only two CBSDs 408 and a single UE 410, the system 400 may include more CBSDs 408 and/or more UEs 410.

A SAS 402 and a CxM 404 may determine a propagation map (i.e., map) based on location information (e.g., GPS) provided by each CBSD 408 to the SAS 402 and/or CxM 404 during initial registration. Additionally, the SAS 402 and/or the CxM 404 may have access to data describing the terrain/building structure near each CBSD 408, i.e., data that describes the physical propagation environment near each CBSD 408. The CxM 404 may use various pathloss metrics in the map to allocate/grant spectrum to the various CBSDs 408.

For example, the map may include an inter-CBSD pathloss ($G_{1,2}$) 442 between the serving CBSD 408A and the interfering CBSD 408B. The inter-CBSD pathloss ($G_{1,2}$) 442 may indicate a reduction in power density (i.e., attenuation) of a wireless signal as it propagates from the serving CBSD 408A to the interfering CBSD 408B or vice versa. The inter-CBSD pathloss ($G_{1,2}$) 442 may be determined using location and/or terrain/building structure information near the CBSDs 408. Additionally, or alternatively, the SAS 402 and/or the CxM 404 may use aggregated measurement reports from the CBSDs 408 to determine the inter-CBSD pathloss ($G_{1,2}$) 442 in the map. Additionally, the inter-CBSD pathloss ($G_{1,2}$) 442 may be determined and/or improved using direct CBSD 408 measurements, e.g., measurements taken at the serving CBSD 408A of the signal from the interfering CBSD 408B or vice versa.

The map may be continually updated and/or improved. Specifically, the CxM 404 may use aggregated measurement reports from the CBSDs 408 to identify and correct inaccurate information in the map. For example, the UE 410 may periodically send UE 410 measurement reports to the serving CBSD 408A, where each UE 410 measurement report may include at least a signal metric (i.e., a metric relating to a desired signal received from the serving CBSD 408A) and an LTE interference metric (i.e., a metric relating to an interfering signal from the interfering CBSD 408B). The serving CBSD 408A may combine multiple UE 410 measurement reports from the UE 410 and/or from other UEs (not shown) into an aggregated measurement report according to the one of the four options described above. The serving CBSD 408A may send the aggregated measurement report to the CxM 404, e.g., via the SAS 402.

The CxM 404 may also determine a first CBSD-UE pathloss ($G_{1,UE}$) 440A and a second CBSD-UE pathloss ($G_{2,UE}$) 440B from the aggregated measurement report. The first CBSD-UE pathloss ($G_{1,UE}$) 440A may indicate a reduction in power density (i.e., attenuation) of a wireless signal as it propagates from the serving CBSD 408A to the UE 410 or vice versa. The second CBSD-UE pathloss ($G_{2,UE}$) 440B may indicate a reduction in power density (i.e., attenuation) of a wireless signal as it propagates from the interfering CBSD 408B to the UE 410 or vice versa.

In one configuration, the CxM 404 may determine the inter-CBSD pathloss ($G_{1,2}$) 442 based on upon the modeling methodology used for the map and an estimated distance ($d_{1,2}$) between the serving CBSD 408A and the interfering CBSD 408B. The estimated distance ($d_{1,2}$) between the serving CBSD 408A and the interfering CBSD 408B may be determined using location information of the CBSDs 408 obtained during registration with the SAS 402.

Once the first CBSD-UE pathloss ($G_{1,UE}$) 440A and the second CBSD-UE pathloss ($G_{2,UE}$) 440B are determined, the CxM 404 may use an inverse pathloss function to estimate a first CBSD-UE distance ($d_{1,UE}$) from the serving CBSD 408A to the UE 410 and a second CBSD-UE distance ($d_{2,UE}$) from the interfering CBSD 408B to the UE 410. Additionally, if the inter-CBSD pathloss ($G_{1,2}$) 442 was previously corrected with CBSD 408 measurements, then the estimated distance ($d_{1,2}$) between the serving CBSD 408A and the interfering CBSD 408B may also be determined again using the corrected CBSD-UE pathloss ($G_{1,UE}$) 440A. The inverse pathloss function may be the inverse function to one used to build the map. Using the inverse pathloss function, a pathloss input may generate a distance output. Any suitable inverse pathloss function may be used herein, and the type of inverse pathloss function may depend on how the pathloss is estimated. In other words, any function that is capable of reverse engineering distance based on pathloss (e.g., a curve denoting pathloss) may be used.

When the estimated distance ($d_{1,2}$) between the serving CBSD 408A and the interfering CBSD 408B is greater than the sum of first CBSD-UE distance ($d_{1,UE}$) from the serving CBSD 408A to the UE 410 and the second CBSD-UE distance ($d_{2,UE}$) from the interfering CBSD 408B to the UE 410 (i.e., in response to determining that $d_{1,2} > (d_{1,UE} + d_{2,UE})$), the CxM 404 may correct/adjust the inter-CBSD pathloss ($G_{1,2}$) 442. In other words, when $d_{1,2} > (d_{1,UE} + d_{2,UE})$, the pathloss computation for the inter-CBSD pathloss ($G_{1,2}$) 442 may need a correction. Accordingly, a corrected inter-CBSD pathloss ($G_{1,2}$) may be determined according to: $G_{1,2,new} \approx G_{1,2} + \alpha(d_{1,2} - (d_{1,UE} + d_{2,UE}))$; where $\alpha(d)$ is a scaling function. For example, if the pathloss is of the form $\beta * \log(d) + c$ (where $\beta$ is a constant called the pathloss exponent, d is the distance, and c is a constant), the pathloss correction $\alpha(d)$ could be similarly a log function. In some examples, $\alpha(d)$ may be determined by trial and error.

Alternatively, when the estimated distance ($d_{1,2}$) between the serving CBSD 408A and the interfering CBSD 408B is less than or equal to the sum of first CBSD-UE distance ($d_{1,UE}$) from the serving CBSD 408A to the UE 410 and the second CBSD-UE distance ($d_{2,UE}$) from the interfering CBSD 408B to the UE 410 (i.e., when $d_{1,2} \Leftarrow (d_{1,UE} + d_{2,UE})$), it may be more difficult to detect pathloss estimation. Accordingly, when $d_{1,2} \Leftarrow (d_{1,UE} + d_{2,UE})$, the CxM 404 may not determine a corrected inter-CBSD pathloss ($G_{1,2}$). Alternatively, when $d_{1,2} \Leftarrow (d_{1,UE} + d_{2,UE})$, the CxM 404 may determine a corrected inter-CBSD pathloss ($G_{1,2}$) another way.

The procedure described in conjunction with FIG. 4 (i.e., identifying and corrected inaccuracies in the pathloss modeling) may be performed using one or more aggregated measurement reports according to the fourth option, i.e., of the form [signal bin index x, interference bin index y, P(x,y)] or [$R_1$, $R_2$, $P(R_1,R_2)$]. The computations can be performed using the [R1, R2] pairs with the most significant probabilities, i.e., the modes of the distribution. The aggregate correction applied to the inter-CBSD pathloss ($G_{1,2}$) 442 may be determined as a function of multiple individual corrections, or as the maximum correction among them.

Figure 5:
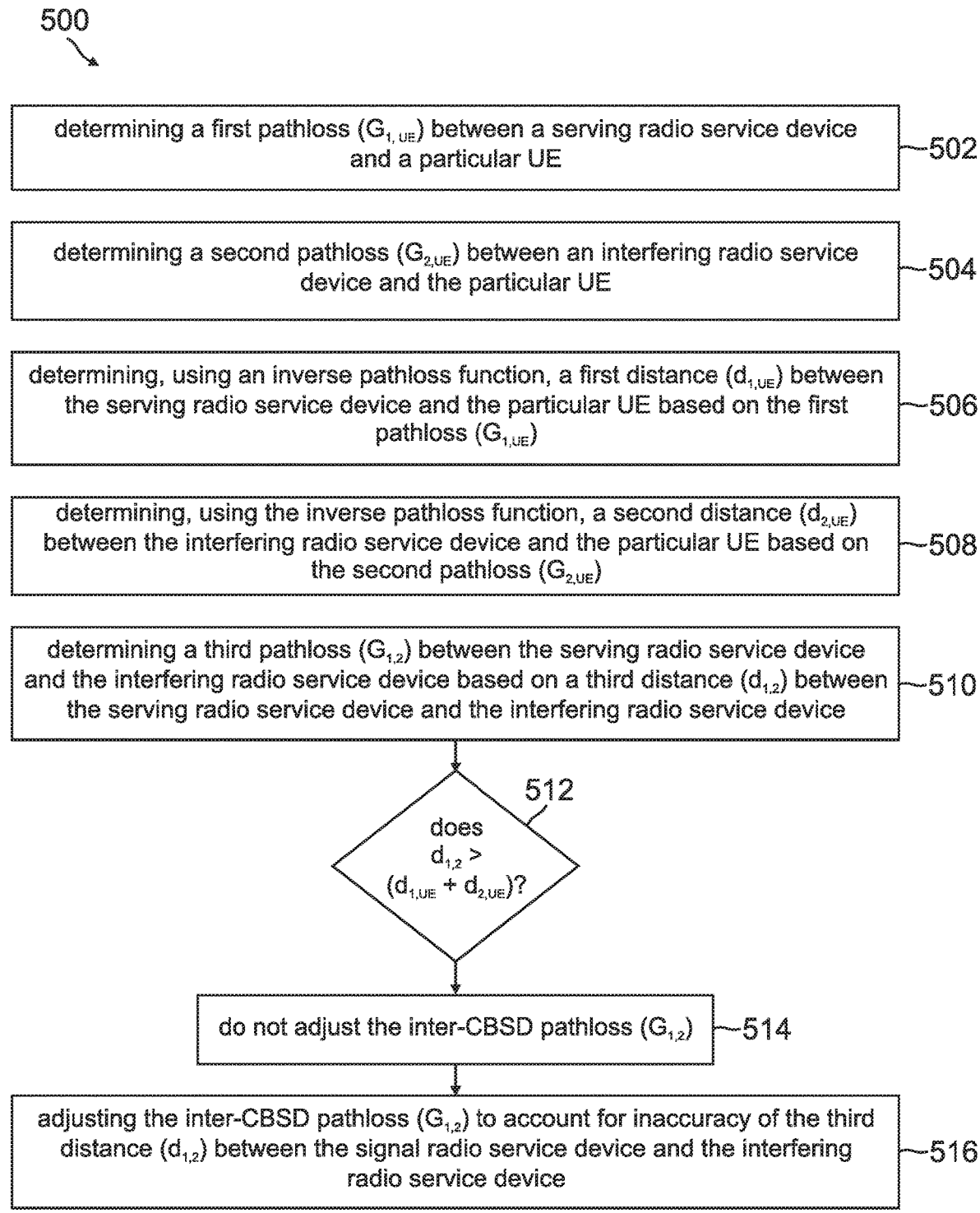
FIG. 5 is a flow diagram illustrating an exemplary method for correcting pathloss modeling in a CBRS system.

FIG. 5 is a flow diagram illustrating an exemplary method 500 for correcting pathloss modeling in a CBRS system 400. The method 500 may be performed by the CxM 404 illustrated in FIG. 4. In the following description, the serving radio service device and the interfering radio service device may be the serving CBSD 408A and the interfering CBSD 408B illustrated in FIG. 4, respectively.

The blocks of the flow diagram shown in FIG. 5 have been arranged in a generally sequential manner for ease of explanation; however, it is to be understood that this arrangement is merely exemplary, and it should be recognized that the processing associated with method 500 (and the blocks shown in FIG. 5) can occur in a different order (for example, where at least some of the processing associated with the blocks is performed in parallel and/or in an event-driven manner). Also, most standard exception handling is not described for ease of explanation; however, it is to be understood that the method 500 can and typically would include such exception handling.

The CxM 404 may determine 502 a first pathloss ($G_{1,UE}$) 440A between a serving radio service device and a particular UE 410. The first pathloss ($G_{1,UE}$) 440A may indicate a reduction in power density (i.e., attenuation) of a wireless signal as it propagates from the serving radio service device to the UE 410 or vice versa.

The CxM 404 may determine the first pathloss ($G_{1,UE}$) 440A from the aggregated measurement report. For example, the CxM 404 may determine the first pathloss ($G_{1,UE}$) 440A based on a signal metric measured by the UE 410, where the signal metric is an RSRP or SINR for a signal received, by the UE 410, from the serving radio service device. The serving radio service device may receive the signal metric in a UE 410 measurement report and include it in an aggregated measurement report sent to the CxM 404. It should be noted that the aggregated measurement report may include the signal metric itself or a value derived from the signal metric, e.g., an average (or median) of the signal metric and other signal metrics measured by the UE 410 for the serving radio service device according to the second or third option above, a probability (P(x,y) or P($R_1,R_2$)) according to the fourth option above, etc.

The CxM 404 may also determine 504 a second pathloss ($G_{2,UE}$) 440B between an interfering radio service device and the particular UE 410. The second pathloss ($G_{2,UE}$) 440B may indicate a reduction in power density (i.e., attenuation) of a wireless signal as it propagates from the interfering CBSD 408B to the UE 410 or vice versa.

The CxM 404 may determine the second pathloss ($G_{2,UE}$) 440B from the aggregated measurement report. For example, the CxM 404 may determine the second pathloss ($G_{2,UE}$) 440B based on an LTE interference metric measured by the UE 410, where the LTE interfering metric is an RSRP or SINR for a signal received, by the UE 410, from the interfering radio service device. The serving radio service device may receive the LTE interference metric in a UE 410 measurement report and include it in an aggregated measurement report sent to the CxM 404. It should be noted that the aggregated measurement report may include the LTE interference metric itself or a value derived from the LTE interference metric, e.g., an average (or median) of the LTE interference metric and other LTE interference metrics measured by the UE 410 for the interfering radio service device according to the second or third option above, a probability (P(x,y) or P($R_1,R_2$)) according to the fourth option above, etc.

The CxM 404 may also determine 506, using an inverse pathloss function, a first distance ($d_{1,UE}$) between the serving radio service device and the particular UE based on the first pathloss ($G_{1,UE}$) 440A. The CxM 404 may also determine 508, using the inverse pathloss function, a second distance ($d_{2,UE}$) between the interfering radio service device and the particular UE based on the second pathloss ($G_{2,UE}$) 440B.

The CxM 404 may also determine 510 a third pathloss ($G_{1,2}$) 442 between the serving radio service device and the interfering radio service device based on a third distance ($d_{1,2}$) between the serving radio service device and the interfering radio service device. The third pathloss ($G_{1,2}$) 442 may indicate a reduction in power density (i.e., attenuation) of a wireless signal as it propagates from the serving radio service device to the interfering radio service device or vice versa.

The third pathloss ($G_{1,2}$) 442 may be determined using location and/or terrain/building structure information near the radio service devices. Additionally, or alternatively, the SAS 402 and/or the CxM 404 may use aggregated measurement reports from the radio service devices to determine the third pathloss ($G_{1,2}$) 442 in the map. Additionally or alternatively, the third pathloss ($G_{1,2}$) 442 may be determined and/or improved by direct measurements from the radio service devices, e.g., measurements taken at the serving radio service device and/or the interfering radio service device. Furthermore, the CxM 404 may determine 506 the third pathloss ($G_{1,2}$) 442 using a pre-existing map.

The CxM 404 may also determine 512 whether the third distance ($d_{1,2}$) between the serving radio service device and the interfering radio service device is greater than the sum of first distance ($d_{1,UE}$) and the second distance ($d_{2,UE}$), i.e., the CxM 404 may determine 512 whether $d_{1,2} > (d_{1,UE} + d_{2,UE})$. When $d_{1,2} > (d_{1,UE} + d_{2,UE})$, the CxM 404 may adjust 516 the third pathloss ($G_{1,2}$) 442. In other words, when $d_{1,2} > (d_{1,UE} + d_{2,UE})$, the pathloss computation for the third pathloss ($G_{1,2}$) 442 may need a correction. Accordingly, a corrected third pathloss ($G_{1,2}$) may be determined according to: $G_{1,2,new} \approx G_{1,2} + \alpha(d_{1,2} - (d_{1,UE} + d_{2,UE}))$; where $\alpha(d)$ is a scaling function.

When the third distance ($d_{1,2}$) between the serving CBSD 408A and the interfering CBSD 408B is less than or equal to the sum of first distance ($d_{1,UE}$) and the second distance ($d_{2,UE}$), i.e., $d_{1,2} \Leftarrow (d_{1,UE} + d_{2,UE})$, the CxM 404 may not determine 514 a corrected third pathloss ($G_{1,2}$). Alternatively, when $d_{1,2} \Leftarrow (d_{1,UE} + d_{2,UE})$, the CxM 404 may determine a corrected third pathloss ($G_{1,2}$) another way.

Computer System Overview

Configurations of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Figure 6:
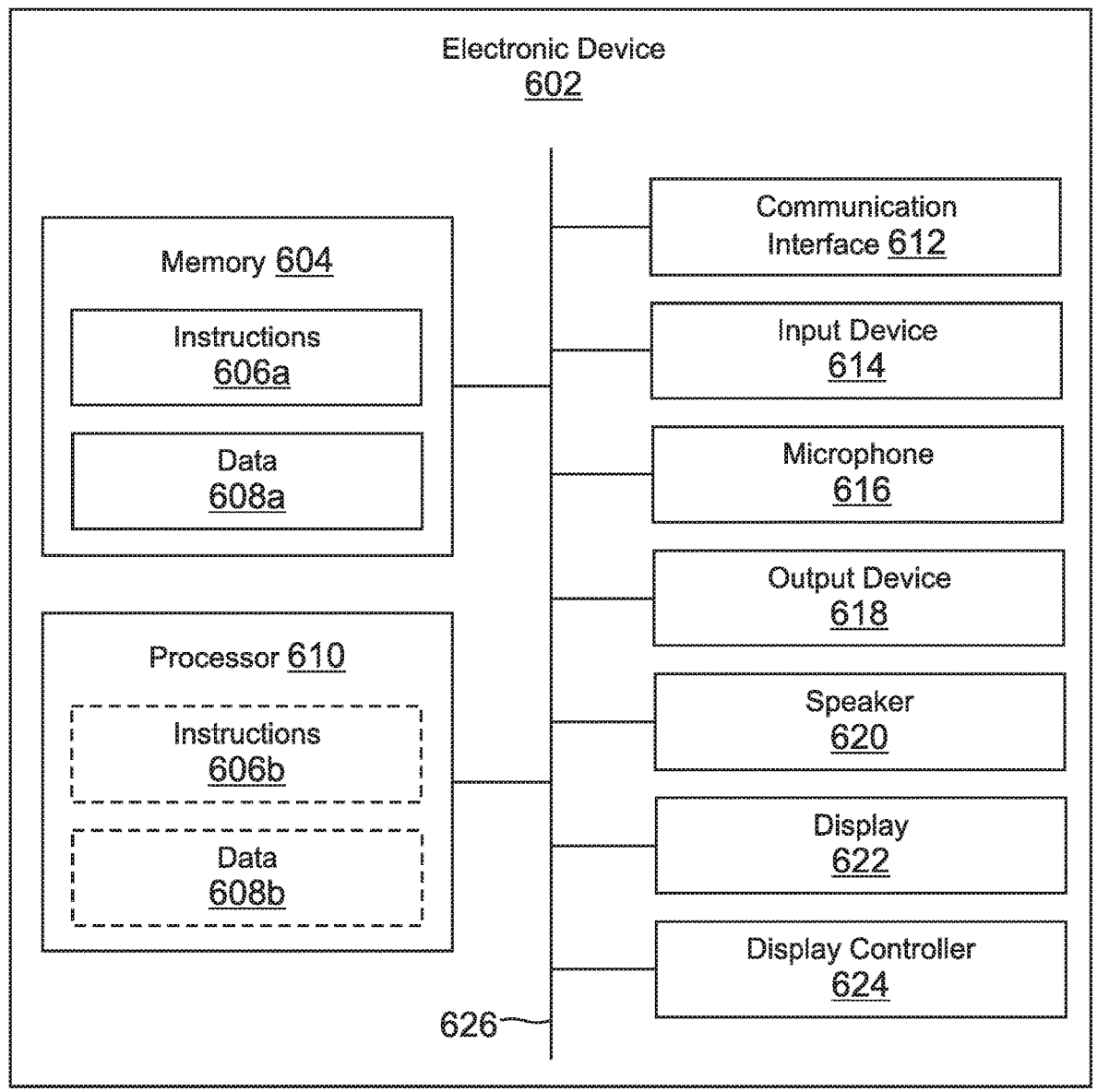
FIG. 6 is a block diagram illustrating an example of an electronic device that may utilize some configurations of the present disclosure.

As such, FIG. 6 is a block diagram illustrating an example of an electronic device that may be utilized in some configurations of the present disclosure. The illustrated components may be located within the same physical structure or in separate housings or structures. The SAS 102, CXM 104, CBSD 108 and/or UE 110 described above may utilize one or more of the electronic devices 602 described in FIG. 6. The electronic device 602 includes a processor 610. The processor 610 may be a general purpose single- or multi-chip microprocessor (e.g., an ARM), a special purpose microprocessor (e.g., a digital signal processor (DSP)), a microcontroller, a programmable gate array, a Field Programmable Gate Array (FGPA), an application specific integrated circuit (ASIC), etc. The processor 610 may be referred to as a central processing unit (CPU). Although just a single processor 610 is shown in the electronic device 602 of FIG. 6, in an alternative configuration, a combination of processors (e.g., an ARM and DSP) could be used.

The electronic device 602 also includes memory 604 in electronic communication with the processor 610. That is, the processor 610 can read information from and/or write information to the memory 604. The memory 604 may be any electronic component capable of storing electronic information. The memory 604 may include a machine-readable medium (also referred to as a computer-readable medium) having stored thereon instructions that may be used to program a computer (or other electronic devices) to perform a process. The machine-readable medium may include, for example, floppy diskettes, optical disks, compact disc read-only memories (CD-ROMs), digital video discs (DVDs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. The machine-readable medium may be tangible and non-transitory.

Data 608a and instructions 606a may be stored in the memory 604. The instructions 606a may include one or more programs, routines, sub-routines, functions, procedures, etc. The instructions 606a may include a single computer-readable statement or many computer-readable statements. The instructions 606a may be executable by the processor 610 to implement one or more of the methods, functions and procedures described above. Executing the instructions 606a may involve the use of the data 608a that is stored in the memory 604. FIG. 6 shows some instructions 606b and data 608b being loaded into the processor 610 (which may come from instructions 606a and data 608a).

The electronic device 602 may also include one or more communication interfaces 612 for communicating with other electronic devices. The communication interfaces 612 may be based on wired communication technology, wireless communication technology, or both. Examples of different types of communication interfaces 612 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 602 may also include one or more input devices 614 and one or more output devices 618, e.g., used in conjunction with a user interface. Examples of different kinds of input devices 614 include a keyboard, mouse, microphone, camera remote control device, button, touchscreen, etc. For instance, the electronic device 602 may include one or more microphones 616 that convert acoustic signals (e.g., voice, speech) into electrical or electronic signals. In another example, a camera may track position and/or motion of an object and convert the image(s)/video into instructions to control other devices.

Examples of different kinds of output devices 618 include a speaker, printer, etc. For instance, the electronic device 602 may include one or more speakers 620. In one configuration, a speaker 620 may be a transducer that converts electrical or electronic signals into acoustic signals. One specific type of output device which may be typically included in a electronic device 602 is a display device 622. Display devices 622 used with configurations disclosed herein may utilize any suitable image projection technology, such as a cathode ray tube (CRT), liquid crystal display (LCD), light-emitting diode (LED), organic light-emitting diode (OLED), gas plasma, electroluminescence, or the like. A display controller 624 may also be provided, for converting data stored in the memory 604 into text, graphics, and/or moving images (as appropriate) shown on the display device 622.

The various components of the electronic device 602 may be coupled together by one or more buses, which may include a power bus, a control signal bus, a status signal bus, a data bus, etc. For simplicity, the various buses are illustrated in FIG. 6 as a bus system 626. Furthermore, various other architectures and components may be utilized in connection with any electronic device described herein.

Terminology

Brief definitions of terms, abbreviations, and phrases used throughout this application are given below.

The term "determining" may include calculating, extracting, generating, computing, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary configurations", "in example configurations", "in some configurations", "according to some configurations", "in the configurations shown", "in other configurations", "configurations", "in examples", "examples", "in some examples", "some examples" and the like generally mean the particular feature, structure, or characteristic following the phrase is included in at least one configuration of the present disclosure, and may be included in more than one configuration of the present disclosure. In addition, such phrases do not necessarily refer to the same configurations or different configurations.

If the specification states a component or feature "may," "can," "could," or "might" be included or have a characteristic, that particular component or feature is not required to be included or have the characteristic.

The terms "responsive" or "in response to" may indicate that an action is performed completely or partially in response to another action.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks. The transmission medium used by a network may include coaxial cable, fiber optic cable, twisted pair, digital subscriber line (DSL), or combinations thereof. Wireless networks may also use air as a transmission medium.

Also, for the sake of illustration, various configurations of the present disclosure have herein been described in the context of computer programs, physical components, and logical interactions within modern computer networks. Importantly, while these configurations describe various configurations of the present disclosure in relation to modern computer networks and programs, the method and apparatus described herein are equally applicable to other systems, devices, and networks as one skilled in the art will appreciate. As such, the illustrated applications of the configurations of the present disclosure are not meant to be limiting, but instead are examples. Other systems, devices, and networks to which configurations of the present disclosure are applicable include, for example, other types of communication and computer devices and systems. More specifically, configurations are applicable to communication systems, services, and devices such as cell phone networks and compatible devices. In addition, configurations are applicable to all levels of computing from the personal computer to large network mainframes and servers.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The techniques introduced here may be embodied as special-purpose hardware (such as circuitry), as programmable circuitry appropriately programmed with software and/or firmware, or as a combination of special-purpose and programmable circuitry. Hence, configurations may include a machine-readable medium (also referred to as a computer-readable medium) having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. The machine-readable medium may be tangible and non-transitory.

In conclusion, the present disclosure provides novel systems, methods, and arrangements of reporting UE measurements. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a system for reporting UE measurements, comprising: a spectrum access system (SAS) configured to allocate a frequency band in the system; a coexistence manager (CxM) communicatively coupled to the SAS, wherein the CxM allocates a set of radio frequency (RF) channels within the frequency band; and one or more Citizens Broadband Radio Service devices (CBSDs) communicatively coupled to the SAS and CxM and configured to provide wireless service to user equipment (UEs) using one or more of the RF channels allocated by the CxM; wherein the CxM is configured to manage co-existence of the CBSDs and advise the SAS on how to allocate the RF channels based, at least in part, on aggregated measurement reports provided to the CxM from the CBSDs; and wherein each CBSD is configured to determine the aggregated measurement reports based on UE measurement reports it receives from UEs that it serves, wherein each CBSD is configured to send the aggregated measurement reports to the CxM.

Example 2 includes the system of Example 1, wherein each UE measurement report comprises at least one of: a signal metric, an Long Term Evolution (LTE) interference metric, a non-LTE interference metric, and a fifth generation (5G) interference metric.

Example 3 includes the system of any of Examples 1-2, wherein each CBSD determines an aggregated measurement report per neighboring device that interferes with communication between the respective CBSD and at least one of the UEs served by the respective CBSD.

Example 4 includes the system of any of Examples 1-3, wherein each aggregated measurement report is based on UE measurement reports aggregated across multiple UEs.

Example 5 includes the system of Example 4, wherein each aggregated measurement report comprises an average signal metric and an average LTE interference metric determined across all UE measurement reports that have an LTE interference metric above a minimum threshold.

Example 6 includes the system of any of Examples 4-5, wherein the UE measurement reports received at a particular CBSD are segregated into bins based on the signal metric in each UE measurement report, wherein each aggregated measurement report comprises, for each bin, a signal metric for the respective bin and an average LTE interference metric across all UE measurement reports in the respective bin.

Example 7 includes the system of Example 4, wherein the UE measurement reports received at a particular CBSD are mapped to a two-dimensional density function with a plurality of bins based on a signal metric and an LTE interference metric in each bin, wherein each aggregated measurement report comprises a probability or cardinality of each bin.

Example 8 includes the system of any of Examples 1-7, wherein the CxM determines: a first pathloss ($G_{1,UE}$) between a serving Citizens Broadband Radio Service device (CBSD) and a particular UE based on a first signal metric from the particular UE ($R_1$); a first distance ($d_{1,UE}$) between the serving CBSD and the particular UE based on an inverse pathloss function and the first pathloss ($G_{1,UE}$) between the serving CBSD and the particular UE; a second pathloss ($G_{2,UE}$) between an interfering CBSD and the particular UE based on a second signal metric from the particular UE ($R_2$); a second distance ($d_{2,UE}$) between the interfering CBSD and the particular UE based on the inverse pathloss function and the second pathloss ($G_{2,UE}$) between the interfering CBSD and the particular UE; and a third pathloss ($G_{1,2}$) between the serving CBSD and the interfering CBSD based on a third distance ($d_{1,2}$) between the serving CBSD and the interfering CBSD.

Example 9 includes the system of Example 8, wherein, in response to determining that $d_{1,2}>(d_{1,UE}+d_{2,UE})$, the CxM adjusts the third pathloss ($G_{1,2}$) between the serving CBSD and the interfering CBSD to account for inaccuracy of the third distance ($d_{1,2}$) between the serving CBSD and the interfering CBSD.

Example 10 includes the system of any of Examples 8-9, wherein, when $d_{1,2}\Leftarrow(d_{1,UE}+d_{2,UE})$, the CxM does not adjust the third pathloss ($G_{1,2}$) between the serving CBSD and the interfering CBSD.

Example 11 includes the system of any of Examples 8-10, wherein the CxM adjusts the third pathloss ($G_{1,2}$) between the serving CBSD and the interfering CBSD and/or the third distance ($d_{1,2}$) using measurements made directly at the serving CBSD, the interfering CBSD, or both.

Example 12 includes a method for reporting UE measurements, comprising: allocating, by a spectrum access system (SAS), a set of radio frequency (RF) channels to a Citizens Broadband Radio Service (CBRS) system; allocating, by a coexistence manager (CxM) serving the CBRS system, one or more of the RF channels to a particular CBSD of a plurality of CBSDs in the CBRS system; providing, by the particular CBSD, wireless service to user equipment (UEs) using one or more of the RF channels; collecting, at the particular CBSD, UE measurement reports from the UEs; aggregating, by the particular CBSD, the UE measurement reports into one or more aggregated measurement reports; and sending, from the particular CBSD, the one or more aggregated measurement reports to the CxM.

Example 13 includes the method of Example 12, wherein each UE measurement report comprises at least one of: a signal metric, a Long Term Evolution (LTE) interference metric, a non-LTE interference metric, and a fifth generation (5G) interference metric.

Example 14 includes the method of any of Examples 12-13, wherein the particular CBSD determines an aggregated measurement report per neighboring device that interferes with communication between the particular CBSD and at least one of the UEs served by the particular CBSD.

Example 15 includes the method of any of Examples 12-14, wherein each aggregated measurement report is based on UE measurement reports aggregated across multiple UEs.

Example 16 includes the method of Example 15, wherein each aggregated measurement report comprises an average signal metric and an average LTE interference metric determined across all UE measurement reports that have an LTE interference metric above a minimum threshold.

Example 17 includes the method of any of Examples 15-16, wherein the UE measurement reports received at the particular CBSD are segregated into bins based on the signal metric in each UE measurement report, wherein each aggregated measurement report comprises, for each bin, a signal metric for the respective bin and an average LTE interference metric across all UE measurement reports in the respective bin.

Example 18 includes the method of any of Examples 15-17, wherein the UE measurement reports received at the particular CBSD are mapped to a two-dimensional density function with a plurality of bins based on a signal metric and an LTE interference metric in each bin, wherein each aggregated measurement report comprises a probability or cardinality of each bin.

Example 19 includes the method of any of Examples 12-18, further comprising: determining, by the CxM, a first pathloss ($G_{1,UE}$) between a serving CBSD and a particular UE based on a first signal metric from the particular UE ($R_1$); determining, by the CxM, a first distance ($d_{1,UE}$) between the serving CBSD and the particular UE based on an inverse pathloss function and the first pathloss ($G_{1,UE}$) between the serving CBSD and the particular UE; determining, by the CxM, a second pathloss ($G_{2,UE}$) between an interfering CBSD and the particular UE based on a second signal metric from the particular UE ($R_2$); determining, by the CxM, a second distance ($d_{2,UE}$) between the interfering CBSD and the particular UE based on the inverse pathloss function and the second pathloss ($G_{2,UE}$) between the interfering CBSD and the particular UE; and Example 20 includes the method of any of Examples 12-19, further comprising: determining, by the CxM, a third pathloss ($G_{1,2}$) between the serving CBSD and the interfering CBSD based on a third distance ($d_{1,2}$) between the serving CBSD and the interfering CBSD; and adjusting, by the CxM in response to determining that $d_{1,2}>(d_{1,UE}+d_{2,UE})$, the third pathloss ($G_{1,2}$) between the serving CBSD and the interfering CBSD to account for inaccuracy of the third distance ($d_{1,2}$) between the serving CBSD and the interfering CBSD.

The invention claimed is:
1. A system for reporting UE measurements, comprising:
a spectrum access system (SAS) implemented with one or more processors and being configured to allocate a frequency band in the system;
a coexistence manager (CxM) comprising a processor and communicatively coupled to the SAS, wherein the CxM allocates a set of radio frequency (RF) channels within the frequency band; and one or more Citizens Broadband Radio Service devices (CBSDs) communicatively coupled to the SAS and CxM and configured to provide wireless service to user equipment (UEs) using one or more of the RF channels allocated by the CxM;

wherein the CxM is configured to manage co-existence of the CBSDs and advise the SAS on how to allocate the RF channels based, at least in part, on aggregated measurement reports provided to the CxM from the CBSDs; and wherein each CBSD is configured to determine the aggregated measurement reports based on UE measurement reports it receives from UEs that it serves, wherein each CBSD is configured to send the aggregated measurement reports to the CxM.

2. The system of claim 1, wherein each UE measurement report comprises at least one of: a signal metric, an Long Term Evolution (LTE) interference metric, a non-LTE interference metric, and a fifth generation (5G) interference metric.

3. The system of claim 1, wherein each CBSD determines an aggregated measurement report per neighboring device that interferes with communication between the respective CBSD and at least one of the UEs served by the respective CBSD.

4. The system of claim 1, wherein each aggregated measurement report is based on UE measurement reports aggregated across multiple UEs.

5. The system of claim 4, wherein each aggregated measurement report comprises an average signal metric and an average LTE interference metric determined across all UE measurement reports that have an LTE interference metric above a minimum threshold.

6. The system of claim 4, wherein the UE measurement reports received at a particular CBSD are segregated into bins based on a signal metric in each UE measurement report, wherein each aggregated measurement report comprises, for each bin, a bin-specific signal metric for the respective bin and an average LTE interference metric across all UE measurement reports in the respective bin.

7. The system of claim 4, wherein the UE measurement reports received at a particular CBSD are mapped to a two-dimensional density function with a plurality of bins based on a signal metric and an LTE interference metric in each bin, wherein each aggregated measurement report comprises a probability or cardinality of each bin.

8. The system of claim 1, wherein the CxM determines:
a first pathloss ($G_{1,UE}$) between a serving Citizens Broadband Radio Service device (CBSD) and a particular UE based on a first signal metric from the particular UE ($R_1$);
a first distance ($d_{1,UE}$) between the serving CBSD and the particular UE based on an inverse pathloss function and the first pathloss ($G_{1,UE}$) between the serving CBSD and the particular UE;
a second pathloss ($G_{2,UE}$) between an interfering CBSD and the particular UE based on a second signal metric from the particular UE ($R_2$);
a second distance ($d_{2,UE}$) between the interfering CBSD and the particular UE based on the inverse pathloss function and the second pathloss ($G_{2,UE}$) between the interfering CBSD and the particular UE; and
a third pathloss ($G_{1,2}$) between the serving CBSD and the interfering CBSD based on a third distance ($d_{1,2}$) between the serving CBSD and the interfering CBSD.

9. The system of claim 8,
wherein, in response to determining that $d_{1,2}>(d_{1,UE}+d_{2,UE})$, the CxM adjusts the third pathloss ($G_{1,2}$) between the serving CBSD and the interfering CBSD to account for inaccuracy of the third distance ($d_{1,2}$) between the serving CBSD and the interfering CBSD.

10. The system of claim 8, wherein, when $d_{1,2}\leq(d_{1,UE}+d_{2,UE})$, the CxM does not adjust the third pathloss ($G_{1,2}$) between the serving CBSD and the interfering CBSD.

11. The system of claim 8, wherein the CxM adjusts the third pathloss ($G_{1,2}$) between the serving CBSD and the interfering CBSD using the third distance ($d_{1,2}$), measurements made directly at the serving CBSD, measurements made at the interfering CBSD, or some combination.

12. A method for reporting UE measurements, comprising:
allocating, by a spectrum access system (SAS), a set of radio frequency (RF) channels to a Citizens Broadband Radio Service (CBRS) system;
allocating, by a coexistence manager (CxM) serving the CBRS system, one or more of the RF channels to a particular CBSD of a plurality of CBSDs in the CBRS system;
providing, by the particular CBSD, wireless service to user equipment (UEs) using one or more of the RF channels;
collecting, at the particular CBSD, UE measurement reports from the UEs;
aggregating, by the particular CBSD, the UE measurement reports into one or more aggregated measurement reports; and
sending, from the particular CBSD, the one or more aggregated measurement reports to the CxM.

13. The method of claim 12, wherein each UE measurement report comprises at least one of: a signal metric, a Long Term Evolution (LTE) interference metric, a non-LTE interference metric, and a fifth generation (5G) interference metric.

14. The method of claim 12, wherein the particular CBSD determines an aggregated measurement report per neighboring device that interferes with communication between the particular CBSD and at least one of the UEs served by the particular CBSD.

15. The method of claim 12, wherein each aggregated measurement report is based on UE measurement reports aggregated across multiple UEs.

16. The method of claim 15, wherein each aggregated measurement report comprises an average signal metric and an average LTE interference metric determined across all UE measurement reports that have an LTE interference metric above a minimum threshold.

17. The method of claim 15, wherein the UE measurement reports received at the particular CBSD are segregated into bins based on a signal metric in each UE measurement report, wherein each aggregated measurement report comprises, for each bin, a bin-specific signal metric for the respective bin and an average LTE interference metric across all UE measurement reports in the respective bin.

18. The method of claim 15, wherein the UE measurement reports received at the particular CBSD are mapped to a two-dimensional density function with a plurality of bins based on a signal metric and an LTE interference metric in each bin, wherein each aggregated measurement report comprises a probability or cardinality of each bin.

19. The method of claim 12, further comprising:
determining, by the CxM, a first pathloss ($G_{1,UE}$) between a serving CBSD and a particular UE based on a first signal metric from the particular UE ($R_1$);

determining, by the CxM, a first distance ($d_{1,UE}$) between the serving CBSD and the particular UE based on an inverse pathloss function and the first pathloss ($G_{1,UE}$) between the serving CBSD and the particular UE;

determining, by the CxM, a second pathloss ($G_{2,UE}$) between an interfering CBSD and the particular UE based on a second signal metric from the particular UE ($R_2$);

determining, by the CxM, a second distance ($d_{2,UE}$) between the interfering CBSD and the particular UE based on the inverse pathloss function and the second pathloss ($G_{2,UE}$) between the interfering CBSD and the particular UE.

20. The method of claim 19, further comprising:

determining, by the CxM, a third pathloss ($G_{1,2}$) between the serving CBSD and the interfering CBSD based on a third distance ($d_{1,2}$) between the serving CBSD and the interfering CBSD; and adjusting, by the CxM in response to determining that $d_{1,2} > (d_{1,UE} + d_{2,UE})$, the third pathloss ($G_{1,2}$) between the serving CBSD and the interfering CBSD to account for inaccuracy of the third distance ($d_{1,2}$) between the serving CBSD and the interfering CBSD.

* * * * *